(12) United States Patent
Kamins

(10) Patent No.: US 7,719,688 B2
(45) Date of Patent: May 18, 2010

(54) OPTICAL DEVICE AND METHOD OF MAKING THE SAME

(75) Inventor: Theodore I. Kamins, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 275 days.

(21) Appl. No.: 11/739,272

(22) Filed: Apr. 24, 2007

(65) Prior Publication Data
US 2008/0266572 A1    Oct. 30, 2008

(51) Int. Cl.
G01B 9/02      (2006.01)
G02B 6/26      (2006.01)
G02B 6/42      (2006.01)

(52) U.S. Cl. .......................... 356/477; 385/27; 977/762

(58) Field of Classification Search ................ 356/477; 385/27; 977/762
See application file for complete search history.

(56) References Cited

U.S. PATENT DOCUMENTS

| | | | | |
|---|---|---|---|---|
| 5,422,967 A * | 6/1995 | Inoue et al. | .................... | 385/16 |
| 6,887,365 B2 | 5/2005 | Naughton | | |
| 2003/0098488 A1* | 5/2003 | O'Keeffe et al. | ............ | 257/401 |
| 2005/0133476 A1* | 6/2005 | Islam et al. | ..................... | 216/2 |
| 2006/0057360 A1* | 3/2006 | Samuelson et al. | .......... | 428/323 |
| 2006/0097389 A1 | 5/2006 | Islam et al. | | |
| 2008/0019648 A1* | 1/2008 | Atwater et al. | ............... | 385/122 |
| 2008/0079104 A1* | 4/2008 | Stewart et al. | ............... | 257/433 |
| 2008/0266556 A1* | 10/2008 | Kamins et al. | ............... | 356/301 |
| 2009/0003783 A1* | 1/2009 | Mazur et al. | ................. | 385/115 |

OTHER PUBLICATIONS

Sirbuly et al. "Optical routing and sensing with nanowire assemblies" PNAS vol. 102, No. 22. May 31, 2005. pp. 7800-7805.*
Ma et al. "Synthesis of CdS nanowire networks and their optical and electrical properties" Nanotechnology 18 2007. pp. 1-5.*
Pauzauskie et al. "Nanowire photonics" Materialstoday. vol. 9, No. 10. Oct. 2006. pp. 36-45.*
U.S. Appl. No. 11/297,900, filed Dec. 9, 2005, Kuekes et al.
Yasseri, et al, "Electroless Deposition of Au Nanocrystals on Si(111)Surfaces as Catalysts for Epitaxial Growth of Si Nanowires"Electrochemical & Solid-State Ltrs(2006)C185-C188.
Yasseri, et al. "Growth and Use of Metal Nanycrystal Assemblies on High-Density Silicon Nanowires Formed by Chemical Vapor Deposition", Appl.Phys.A 82, (2006),pp. 659-664.
Kuo et al. "Strong Quantum-Confined Stark Effect in Germanium Quantum-Well Structures on Silicon", Nature, vol. 437, Oct. 27, 2005, pp. 1334-1336.

* cited by examiner

*Primary Examiner*—Patrick J Connolly

(57) ABSTRACT

An optical device includes a primary nanowire having a predetermined characteristic that affects an optical property of the primary nanowire. At least one secondary nanowire abuts the primary nanowire at a non-zero angle. The secondary nanowire(s) have another predetermined characteristic that affects an optical property of the secondary nanowire(s). A junction is formed between the primary and secondary nanowires. The device is configured to cause a portion of a light beam of a predetermined wavelength or range of wavelengths traveling through one of the primary nanowire or the secondary nanowire(s) to enter another of the secondary nanowire(s) or the primary nanowire.

21 Claims, 3 Drawing Sheets

ESTABLISHING A PRIMARY NANOWIRE ON A SUBSTRATE SURFACE

OPERATIVELY CONNECTING AT LEAST ONE SECONDARY NANOWIRE SUCH THAT THE AT LEAST ONE SECONDARY NANOWIRE ABUTS A SURFACE OF THE PRIMARY NANOWIRE AT A NON-ZERO ANGLE, THEREBY FORMING A JUNCTION BETWEEN THE PRIMARY NANOWIRE AND THE AT LEAST ONE SECONDARY NANOWIRE, THE DEVICE BEING CONFIGURED TO CAUSE A PORTION OF A LIGHT BEAM OF A PREDETERMINED WAVELENGTH OR RANGE OF WAVELENGTHS TRAVELING THROUGH ONE OF THE PRIMARY NANOWIRE OR THE AT LEAST ONE SECONDARY NANOWIRE TO ENTER ANOTHER OF THE AT LEAST ONE SECONDARY NANOWIRE OR THE PRIMARY NANOWIRE

FIG. 1

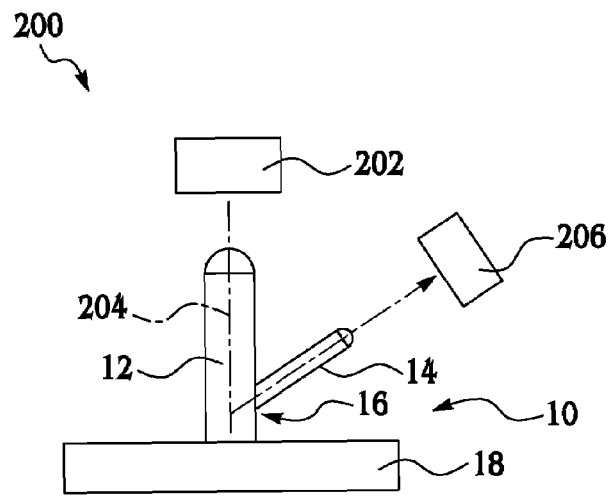

FIG. 6

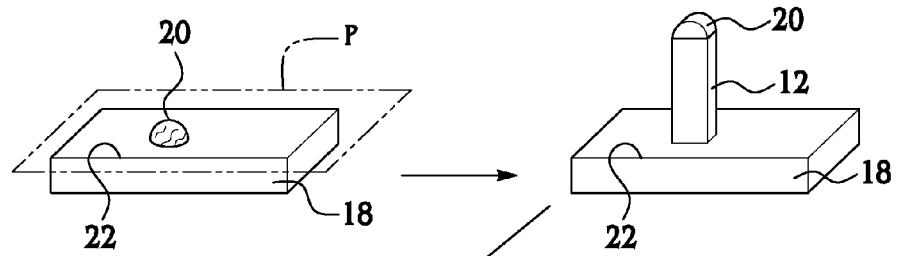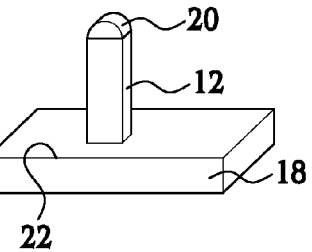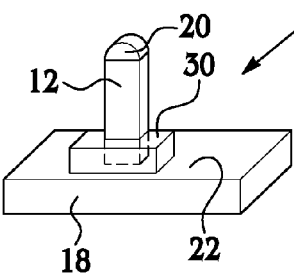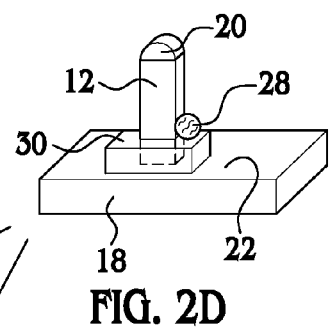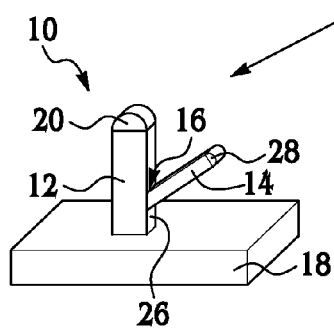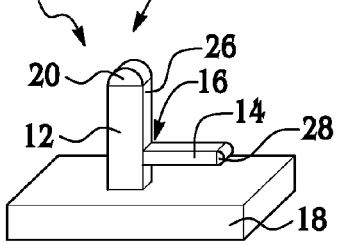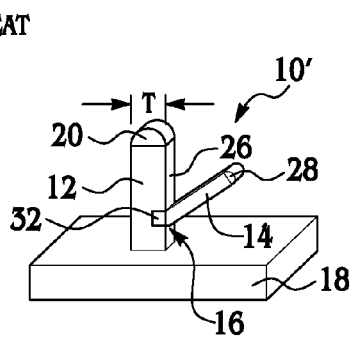

OPTICAL DEVICE AND METHOD OF MAKING THE SAME

BACKGROUND

The present disclosure relates generally to optical device(s) and method(s) for making the same.

Since the inception of semiconductor technology, a consistent trend has been toward the development of smaller device dimensions and higher device densities. As a result, nanotechnology has seen explosive growth and generated considerable interest. Nanotechnology is centered on the fabrication and application of nano-scale structures, or structures having dimensions that are often 5 to 100 times smaller than conventional semiconductor structures. Nanowires are included in the category of nano-scale structures.

Nanowires are wire-like structures having at least one linear dimension (e.g., diameter) ranging from about 3 nm to about 200 nm. Nanowires are suitable for use in a variety of applications, including functioning as conventional wires for interconnection applications or as semiconductor devices. Nanowires are also the building blocks of many potential optical nano-scale devices, such as light emitting diodes (LEDs), nanowire-based fiber optic devices, optical sensors, and display screens, to name a few. Manual assembly may be particularly problematic when forming such optical nano-scale devices.

BRIEF DESCRIPTION OF THE DRAWINGS

Features and advantages of embodiments of the present disclosure will become apparent by reference to the following detailed description and drawings, in which like reference numerals correspond to similar, through not necessarily identical, components. For the sake of brevity, reference numerals or features having a previously described function may not necessarily be described in connection with other drawings in which they appear.

FIG. 1 is a flow diagram depicting an embodiment of a method of forming an optical device;

FIGS. 2A through 2F are schematic perspective views of an embodiment of the method of making an embodiment of the optical device;

FIGS. 2A through 2D and 2G are schematic perspective views of another embodiment of the method of making another embodiment of the optical device;

FIG. 6 is a schematic view of an optical system including an embodiment of the optical device.

DETAILED DESCRIPTION

Figure 3:
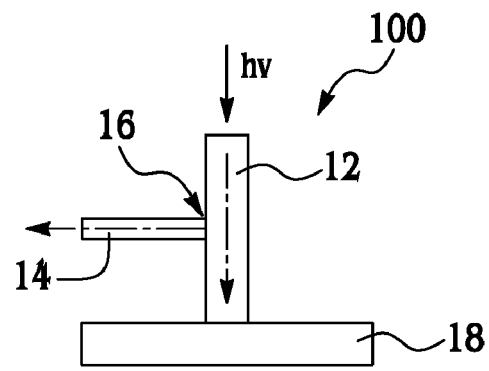
FIG. 3 is a schematic view of an embodiment of the optical device.

Embodiment(s) of the optical device, the method of making the optical device, and the optical system, as disclosed herein, advantageously include and/or use nanoscale connections (i.e., junctions) that are assembled using substantially controlled nanowire growth scheme(s). Light beams of a selected wavelength may be modulated (i.e., the magnitude of the light is changed), split, altered, directed, routed, steered, and/or switched at the connection or junction when the device is exposed thereto. In some embodiments, the connection or junction is an electrical junction. It is believed that the optical properties of the device and system disclosed herein may be configured by controlling the growth of primary and secondary nanowires, and selectively constructing the respective nanowires. Selective construction may be accomplished, for example, by controlling characteristic(s) (e.g. the diameter) of the nanowires and/or by selecting particular materials to form the nanowires.

Referring now to FIG. 1, an embodiment of a method of forming an optical device is depicted. The method includes establishing a primary nanowire on a substrate surface. The primary nanowire has a predetermined characteristic that affects an optical property of the primary nanowire. The method further includes operatively connecting at least one secondary nanowire such that the secondary nanowire(s) abut a surface of the primary nanowire at a non-zero angle, thereby forming a junction between the primary nanowire and the secondary nanowire(s). The secondary nanowire also has a predetermined characteristic that affects an optical property of the secondary nanowire(s).

The junction is configured to cause a portion of a light beam of a predetermined wavelength or range of wavelengths traveling through the primary nanowire or the secondary nanowire(s) to enter the other of the secondary nanowire(s) or the primary nanowire. It is to be understood that this and other embodiments of the method and device are described in further detail in reference to the other figures hereinbelow.

Embodiments of the method of forming embodiments of the optical device 10, 10' (shown in FIGS. 2E and 2F, respectively) and 100 (shown in FIG. 2G) are schematically shown in FIGS. 2A-2F, and in FIGS. 2A-2D and 2G. Very generally, the optical device 10, 10', 100 includes a primary nanowire 12 and at least one secondary nanowire 14 that abuts the primary nanowire 12 at a non-zero angle. A junction 16 is formed between the primary nanowire 12 and the secondary nanowire(s) 14.

Referring now to FIGS. 2A through 2F, embodiments of the method of forming the optical device 10, 10' are depicted. FIG. 2A depicts a substrate 18 having a catalyst nanoparticle 20 established thereon. FIG. 2B depicts the primary nanowire 12 that is grown from the surface 22 of the substrate 18.

As shown in FIG. 2A, the substrate 18 includes the catalyst nanoparticle 20 established on a surface 22 thereof. The substrate 18 may be formed with the surface plane being a (111) crystal lattice plane. Such a substrate 18 is referred to as a (111) oriented Si substrate or layer. In this embodiment, the (111) plane is considered to be horizontally oriented with respect to the Cartesian coordinate system. As used herein, the term "horizontal" generally refers to a direction or a plane that is parallel with plane P shown in FIG. 2A, while the term "vertical" generally refers to a direction or plane that is substantially or approximately perpendicular to the plane P shown in FIG. 2A.

As shown in FIG. 2B, the primary nanowire 12 is grown from the substrate surface 22 via any suitable method. In an embodiment, the growth of the primary nanowire 12 is accomplished by establishing the catalyst nanoparticle 20 on the substrate surface 22 and exposing the catalyst nanoparticle 20 to a precursor gas that initiates growth of the primary nanowire 12. The (111) surface orientation often enables growth of a substantially vertical primary nanowire 12, which grows in a typical (111) direction (i.e., perpendicular to the surface). In some instances, the nanowires 12 grow in other directions. Typical formation of the primary nanowire 12 is further described in U.S. patent application Ser. No. 10/982,051, filed on Nov. 5, 2004 (U.S. Publication No. 2006/0097389, published May 11, 2006), incorporated herein by reference in its entirety.

It is to be understood that the primary nanowire 12 may also be horizontally grown from a vertical surface (not shown). The vertical surface may be a sidewall of a post (e.g., an electrode), a sidewall of a trench, or another vertical surface formed by a structure on or in the substrate 18. In this embodiment, a surface parallel to (111) planes of the Si crystal lattice is etched, cut, or polished to form the vertical surface. As such, in this embodiment, the (111) planes are referred to as vertically oriented (111) (with respect to the Cartesian coordinate system) planes or surfaces. Nanowires 12 may be grown via any suitable method. A non-limiting example of the formation of substantially horizontal nanowires 12 is described in U.S. patent application Ser. No. 10/738,176, filed on Dec. 17, 2003 (U.S. Publication No. 2005/0133476, published on Jun. 23, 2005), incorporated by reference herein in its entirety.

Referring back to FIG. 2B, in one embodiment, the catalyst nanoparticle 20 is formed by depositing on the substrate 18 material(s) that forms a nanoparticle 20 during deposition or subsequently forms (e.g., when annealed) the catalyst nanoparticle 20. In another embodiment, a pre-formed catalyst nanoparticle 20 is deposited on the substrate 18. In either embodiment, suitable deposition processes include, but are not limited to, physical deposition processes, solution deposition processes, chemical deposition processes, electrochemical deposition processes, chemical vapor deposition processes, and/or combinations thereof. Non-limiting examples of such catalyst nanoparticles/materials include gold, titanium, platinum, palladium, gallium, nickel, and/or combinations thereof.

It is to be understood that the primary nanowire 12 may also be established via other methods, which may not include the catalyst nanoparticle 20. As a non-limiting example, a nanowire 12 may be established on the surface 22 of the substrate 18 via oxide-assisted growth.

The primary nanowire 12 is configured to have one or more predetermined characteristics that affect an optical property of the nanowire 12. Such characteristics may be selected from length, index of refraction, diameter, decorated surfaces, transmittance/absorbance, and/or combinations thereof.

Controlling the length of the nanowire 12 may be suitable for configuring portions of the nanowire 12 for optimal coupling of predetermined wavelengths. In an embodiment, the length of the nanowire 12 may be a multiple m of half wavelengths such that a standing wave is established with maxima and minima at specific locations along the nanowire 12. The catalyst 28 (see FIG. 2D) for growing the secondary nanowire 14 (see FIGS. 2E-2G) may then be positioned at a node or antinode to minimize or maximize the amount of coupled light. It is believed that intensity is maximized at an antinode, and as such, light of the predetermined wavelength is more effectively coupled at this location.

The length of the primary nanowire 12 may be controlled by controlling the nanowire 12 growth rate and growth time. Example method(s) for controlling nanowire length are provided in U.S. patent application Ser. No. 11/297,900, filed Dec. 9, 2005, which is herein incorporated by reference in its entirety.

Generally, the materials selected for the primary nanowire 12 are capable of transmitting light beams of at least one or more wavelengths therethrough. It is to be understood that the materials may be selected to transmit light beams of any wavelength or range of wavelengths of interest. In some embodiments, the material selected should not appreciably absorb light at the wavelength or at the wavelength range of interest. In other embodiments, the material selected should be configurable, such that light of different wavelengths may be absorbed by different amounts at different times.

Non-limiting examples of such materials include semiconductors, insulators, or a combination of both. It is to be understood that a single material may be selected for the nanowire 12, or that the nanowire 12 may contain multiple segments, at least one of which is formed of a different material than another. It is believed that alternating segments of different materials along the length of the nanowire 12 may enhance transmission of selected wavelengths.

Suitable semi-conductors and insulators include those having a bandgap ($E_g$) that propagates light of a predetermined wavelength and exhibits substantially low levels of absorption of that light. Generally, light having energy greater than the bandgap energy is absorbed, and light having energy less than the bandgap energy is transmitted. In an embodiment, a suitable bandgap ($E_g$) for the semi-conductor materials ranges from about 0.5 eV to about 2 eV. However, it is to be understood that the bandgap ($E_g$) corresponds to the shortest wavelength for transmission of light in a particular material of interest, and the above range is one non-limiting example of a suitable bandgap ($E_g$) range for some materials. Non-limiting examples of suitable semi-conductors for the primary nanowire 12 include silicon, germanium, gallium arsenide, indium phosphide, and/or the like, and/or combinations thereof. Non-limiting examples of suitable insulators include oxides and nitrides, such as, for example, silicon dioxide, aluminum oxide, and silicon nitride.

As non-limiting examples, Si nanowires 12 ($E_g$=1.1 eV) transmit light with wavelengths greater than 1 µm, and Ge nanowires 12 ($E_g$=0.7 eV) transmit light with wavelengths greater than 1.6 µm. Still further, silicon dioxide nanowires 12 transmit light with wavelengths ranging from about 180 nm into the infrared spectrum (bandgap about 8 eV); while silicon nitride ($Si_3N_4$) nanowires begin transmitting light at longer wavelengths than silicon dioxide nanowires 12 because of their smaller bandgap.

The material selected for the primary nanowire 12 may also have a desirable refractive index. Since the refractive index affects the bending of light, the primary nanowire 12 may be formed of a material with a refractive index that desirably affects the wavelength or range of wavelengths of interest.

As previously stated, the primary nanowire 12 may be configured to have a diameter that affects one or more optical properties of the nanowire 12. The diameter of the primary nanowire 12 may act as a filter for certain wavelengths. As such, the diameter may be controlled to allow the wavelength or range of wavelengths of interest to travel through the nanowire 12. In the same regard, the diameter may be controlled such that other wavelengths or range of wavelengths pass in the region surrounding the nanowire 12. In an embodiment, the nanowire 12 diameter is controlled by controlling the diameter of catalyst nanoparticle 20. It is to be understood, however, that the nanowire 12 diameter may also be controlled by controlling the pressure of the deposition ambient or other deposition conditions. Examples of controlling nanowire diameter are discussed in U.S. patent application Ser. No. 11/297,900 (previously mentioned hereinabove).

In an embodiment, the wavelength equals D/(2n), where D is the nanowire 12 diameter, and n is the index of refraction at the wavelength of interest.

The primary nanowire 12 may also be configured to have a decorated surface. Non-limiting examples of such decorated surfaces include conductive particles, semi-conductive particles or insulating particles or conformal coatings established on the surface of the nanowire 12. Such decorated surfaces may affect one or more optical properties of the nanowire 12. Metal decorated nanowires are further described in U.S. patent application Ser. No. 11/537,589, filed on Sep. 29, 2006, incorporated herein by reference in its entirety.

Once the primary nanowire 12 is grown or established having the desirable characteristic(s), at least one secondary nanowire 14 is operatively connected to the primary nanowire 12. It is to be understood that the secondary nanowire(s) 14 are grown or are otherwise established to abut a surface 26 of the primary nanowire 12 at a non-zero angle, as shown in FIG. 2E.

In one embodiment, the secondary nanowire 14 is a preformed nanowire that is attached to the primary nanowire 12 by dispersing the nanowires 14 in solution, and depositing the solution on the primary nanowire 12. In a non-limiting example, when exposed to the solution of nanowires 14, a meniscus forms at the intersection of the primary nanowire 12 and a sacrificial layer 30 (an example of which is shown in FIGS. 2C and 2D) established about the nanowire 12. This intersection is generally the last place to dry, and as such, nanowires 14 remain at this position. In another non-limiting example, nanowires 14 may be attached at numerous positions on nanowire 12 above sacrificial layer 30, and a second sacrificial layer (not shown) may be established to cover at least some of the nanowires 14. Any remaining uncovered nanowires 14 are removed, and then the sacrificial layers are removed, leaving at least one secondary nanowire 14 attached to the primary nanowire 12.

In other embodiments, the secondary nanowire(s) 14 is/are connected to the primary nanowire 12 by establishing another catalyst nanoparticle 28 (shown in FIG. 2D) on the surface 26 of the primary nanowire 12 and growing the secondary nanowire 14 therefrom. It is to be understood that catalyst nanoparticle 28 for the secondary nanowire 14 may be established on the primary nanowire 12 via those methods that are suitable for establishing the catalyst nanoparticle 20 for the primary nanowire 12.

FIGS. 2C and 2D together depict one embodiment of establishing the catalyst nanoparticle 28 on the primary nanowire 12. A sacrificial layer 30 is established about the primary nanowire 12 (e.g., on the substrate surface 22) to a predetermined height. The predetermined height depends, at least in part, on the desirable location for the secondary nanowire 14 (shown in FIG. 2E). In one embodiment, at least a portion of the primary nanowire 12 remains exposed after the sacrificial layer 30 is established. In another embodiment, the entire primary nanowire 12 is covered with the sacrificial layer 30, and then a portion of the sacrificial layer 30 is removed to expose a desirable portion of the primary nanowire 12.

The sacrificial layer 30 may be established via depositing techniques, depositing and etching techniques together, or other like techniques, or combinations thereof. Examples of suitable depositing techniques include, but are not limited to chemical vapor deposition, physical vapor deposition, spin coating, solution deposition processes, or the like, or combinations thereof. Any suitable sacrificial layer 30 may be used, non-limitative examples of which include oxides, nitrides, oxynitrides, photoresists, polymers, or combinations thereof. In a non-limitative example embodiment, the sacrificial layer 30 is polymethylmethacrylate (PMMA). In an example embodiment, the sacrificial layer 30 is deposited via spin coating to a desirable height. In other embodiments, the sacrificial layer 30 is deposited and etched back (e.g., via reactive ion etching) to a desirable height. It is to be understood that if etching is used during establishment of the sacrificial layer 30, the nanoparticle 20 (which catalyzed the primary nanowire 12) may be removed during such a process. In still other embodiments, the sacrificial layer 30 may be an oxide that is planarized (e.g., via chemical mechanical polishing (CMP)), and etched back (e.g., via reactive ion etching) to a desirable height.

As shown in FIG. 2D, once the sacrificial layer 30 is established, the catalyst nanoparticle 28 (or material forming the nanoparticle 28), which enables growth of the secondary nanowire 14, may be deposited on an area of the exposed portion of the primary nanowire 12 that is adjacent to the sacrificial layer 30.

FIG. 2E depicts the removal of the sacrificial layer 30, the growth of the secondary nanowire 14, and the formation of one embodiment of the device 10. Removal of the sacrificial layer 30 may be accomplished by exposing the sacrificial layer 30 to solvents (e.g., acetone, photoresist stripper), with or without ultrasonic agitation. Suitable etchants may also be used to remove the sacrificial layer 30 (e.g., when the layer 30 is an oxide or a nitride). It is to be understood that such etchants are selected so as to remove the sacrificial layer 30 without deleteriously affecting the contact between the catalyst nanoparticle 28 and the primary nanowire 12.

In some embodiments, stronger bonding is achieved via, e.g., annealing (prior to removing the sacrificial layer 30) to form an alloy or to strengthen the physical contact between the catalyst nanoparticle 28 and the primary nanowire 12.

It is to be understood that the sacrificial layer 30 may be removed either before or after the secondary nanowire 14 is grown. It is to be further understood that the sacrificial layer 30 may remain in some embodiments, and thus may be incorporated into the final optical device.

In an embodiment, growth of the secondary nanowire 14 is initiated by exposing the catalyst nanoparticle 28 to a precursor gas. The same or similar methods used to grow the primary nanowire 12 may be used to grow the secondary nanowire 14. It is to be understood that growth conditions and/or precursor gases may be varied as desired. It is to be understood that growth of the secondary nanowire 14 may also be accomplished via any other suitable technique.

Similar to the primary nanowire 12, the secondary nanowire 14 is also configured to have a predetermined characteristic that affects an optical property thereof. The secondary nanowire characteristics are also selected from length, index of refraction, diameter, decorated surfaces, transmittance/absorbance, and/or combinations thereof. It is to be understood that the characteristic(s) that define the primary nanowire 12 may be the same as, or different from those that define the secondary nanowire(s) 14. As such, it is to be understood that, when "an other" predetermined characteristic(s) is/are referred to herein, this is for ease of notation, and the "other" predetermined characteristic(s) may be the same as, or different from a previously mentioned predetermined characteristic(s).

Without being bound to any theory, it is believed that by controlling the predetermined characteristics of the primary and secondary nanowires 12, 14, the light propagation of the device 10 may also advantageously be controlled.

Any of the previously described materials, refractive indices, lengths, diameters, and/or decorated surfaces suitable for forming the primary nanowire 12 are also suitable for forming the secondary nanowire 14. In some instances, to achieve desirable light beam modulation, routing, switching, etc., it may be desirable to select at least one different characteristic for the primary and the secondary nanowires 12, 14. If, for example, more than one secondary nanowire 14 is grown on the primary nanowire 12, it may also be desirable to select at least one different characteristic for each secondary nanowire 14.

As previously stated, FIG. 2E depicts one embodiment of the optical device 10. In this embodiment, neither the primary nor the secondary nanowires 12, 14 are doped. In another embodiment, the secondary nanowire 14 is doped, and abuts the primary nanowire 12 without having any doped regions extending from the secondary nanowire 14 into the primary nanowire 12.

In still another embodiment, as shown in FIG. 2F, the secondary (or branched) nanowire 14 may be doped during or subsequent to growth, and treated during or subsequent to growth, such that a doped region 32 extends from the secondary nanowire 14 into at least a portion of the primary nanowire 12. This diffusion may result in modifying one or more optical properties of the primary nanowire 12.

Doping may be accomplished to create a source for carrier injection. It is to be understood that carriers (electrons and/or holes) may be injected into the nanowires 12, 14 to modulate the light. Heavy doping may result in light absorption; as such, it may not be desirable to extend the dopant through the light-conducting region of the primary nanowire 12. In some embodiments, heavy doping may be more desirable in the secondary nanowire 14 at an area immediately adjacent to the primary nanowire 12. In an embodiment, the carriers are temporarily injected into the primary nanowire 12 by applying an appropriate (e.g., forward) bias between a region of the secondary nanowire 14 and a region of the primary nanowire 12 to decrease the light transmission. The carriers are subsequently removed by changing the electrical bias (e.g., removing the forward bias or applying a reverse bias) to increase the light transmission. Thus, the non-optical behavior (i.e., electrical properties) of the secondary nanowire(s) 14 modulates one or more of the optical properties of the primary nanowire 12.

Diffusion of dopant from the secondary nanowire 14 into the primary nanowire 12 may be accomplished by exposing the nanowires 12, 14 to a predetermined temperature for a predetermined time. The amount of doped region 32 that diffuses into the primary nanowire 12 is controllable via the temperature to which the nanowires 12, 14 are exposed, and the time of such exposure. As such, the exposure temperature and the time of exposure may be increased or decreased depending, at least in part, on the desirable amount of doped region 32 that is to be diffused, and on the optical properties that may desirably be exhibited by the optical device 10'. Furthermore, the temperature and time may be altered depending, at least in part, on the materials used for the nanowires 12, 14, the diameter of the nanowires 12, 14, the doping concentration and species, the surface state density, or combinations thereof.

FIGS. 2A through 2D and 2G depict other embodiments of the method of forming other embodiments of the optical device 100. It is to be understood that the primary and secondary nanowires 12, 14 are formed as described hereinabove.

The device 100 shown in FIG. 2G is similar to the device 10 shown in FIG. 2E, except that the secondary nanowire 14 in FIG. 2G is substantially perpendicular to the primary nanowire 12. In each embodiment of the optical device 10, 10', 100, the secondary nanowire 14 is formed at a non-zero angle with respect to the primary nanowire 12. It is to be understood that the secondary nanowire 14 may be grown at selected angles with respect to the primary nanowire 12. It is believed that the angle at which the secondary nanowire 14 is grown depends, at least in part, on the crystal structure of the surface of the primary nanowire 12 from which the nanowire 14 is grown.

As depicted in the FIG. 2 series, the catalyst nanoparticle 20 may remain in contact with the tip of the primary nanowire 12 after growth of the primary nanowire 12. Generally, the catalyst nanoparticle 20 is retained if further growth of the primary nanowire 12 is desirable during the formation of the secondary nanowire 14. It is to be understood, however, that if additional growth of the primary nanowire 12 is not desired, the catalyst nanoparticle 20 may be removed from the tip of the primary nanowire 12 prior to initiating growth of the secondary nanowire 14.

With reference again to FIGS. 2E-2G, the junction 16 is formed between the primary nanowire 12 and the secondary nanowire 14. When the device 10, 10', 100 is exposed to a light beam of a predetermined wavelength or range of wavelengths, the light beam travels through the primary nanowire 12 or the secondary nanowire 14 and contacts the junction 16. It is to be understood that generally the light beam will enter the nanowire 12, 14 that has been configured for such wavelength(s).

The branched nanowire structure 10, 10', 100 is configured such that the light beam traveling through the structure 10, 10', 100 may be modulated (i.e., magnitude or intensity of light is changed), split, altered, directed, routed, steered, switched from one state to another and/or combinations thereof. More specifically, the structure 10, 10', 10" may be configured to route the light beam (e.g., contain the light beam within a predetermined path), split the light beam, filter certain wavelengths, attenuate the light beam, phase shift the light beam, amplify the light beam, and/or combinations thereof. Switching a state of the light beam generally includes switching from an ON or OFF state to the other of the OFF or ON state. It is believed that the effect that the device 10, 10', 100 has on the light beam depends, at least in part, on the characteristics selected for the respective nanowires 12, 14, the predetermined wavelength of the light beam, the polarization of the light beam, the signal and the bias applied to the device 10, 10', 100, and/or combinations thereof.

In a non-limiting example embodiment shown in FIG. 3, the light beam (represented by the arrows) of the device 100 is split near the junction 16 such that a portion of the beam travels through the nanowire 12, 14 on one side of junction 16, and another portion of the beam travels through the nanowire 12, 14 on the other side of junction 16. As such, some embodiments of the optical device 10, 10', 100 function as an optical beam splitter.

Figure 4:
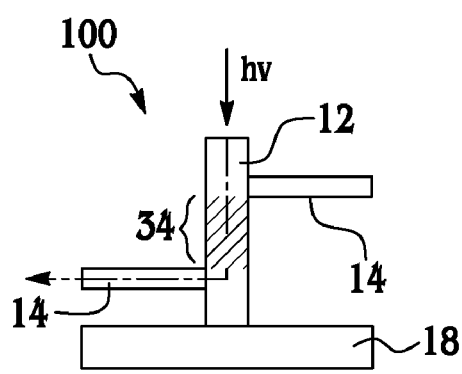
FIG. 4 is a schematic view of another embodiment of the optical device, including a modulator.

FIG. 4 depicts an embodiment of the branched nanowire structure 100, which may be used as an optical beam router. While structure 100 is shown in FIG. 4, any of the structures 10, 10', 100 may be configured to function as an optical beam router. A modulator 34, as discussed below, in one or more branches 12, 14 of the branched nanowire structure 10, 10', 100 modulates, under electronic control, the intensity of the light passing the modulator 34 in one nanowire 12, 14. By allowing or blocking the light in different branches 12, 14, the light may be preferentially directed to one branch 12, 14 or another 14, 12; and thus to components connected to the respective ends of the nanowires 12, 14 or integrated in the nanowires 12, 14 near their respective ends.

Any suitable modulator 34 may be used in the optical beam router embodiment. As shown in FIG. 4, the modulator 34 may be formed in the primary nanowire 12 between two branched secondary nanowires 14. As another non-limiting example, the modulator 34 may be formed by free carrier injection from one doped branch 14, 12 of the branched nanowire structure 10, 10', 100 into the optical path through another branch 12, 14 of the structure 10, 10', 100. Alternatively, modulation may occur in a segment of a nanowire 12, 14 containing a p-i-n core-shell structure. In this example embodiment, either the p-type region or the n-type region is the central core of the nanowire 12, 14, the opposite-type region is the outer shell of the nanowire 12, 14, and an intrinsic (i) region radially separates the two. The intrinsic region of the nanowire 12, 14 may contain a series of shells of different materials, where the shells form a multiple "quantum well" structure (e.g., alternating layers of Ge and a Si—Ge alloy). A voltage applied between the n-type region and the p-type region across the intrinsic region modulates the light absorption in the nanowire branch 12, 14. A planar version of the Ge/SiGe modulator structure has been described in Kuo, et al., "Strong quantum-confined Stark effect in germanium quantum-well structures on silicon," Nature, vol. 437, pp. 1334-1336 (27 Oct. 2005), incorporated herein by reference.

In other embodiments, the optical device 10, 10', 100 is used as an optical interconnection for an advanced, two-dimensional and/or three-dimensional integrated circuit. It is to be understood that the light may be generated externally to the integrated circuit and modulated by the devices 10, 10', 100 within the integrated circuit. In one configuration, light travels from the location of one electronic component to the location of another electronic component through the nanowires 12, 14. The branched structure 10, 10', 100 advantageously allows the direction of the light to be changed without requiring macroscopic-size mirrors. In another configuration, when the device 10, 10', 100 is exposed to light, the light beam travels from one location (e.g., through the primary nanowire 12) to more than one other location (e.g., through the primary nanowire 12 and through multiple secondary nanowires 14), thus distributing a signal to multiple electronic components of the integrated circuit.

In still other embodiments, the optical device 10, 10', 100 may be used for routing in an integrated three-dimensional optical circuit. The device 10, 10', 100 acts as a filter that may be combined with other circuit components, and is selected based on the wavelength of the light beam to be exposed thereto. In a non-limiting example, the wavelength transmitted by the filter corresponds with the diameter and index of refraction of the nanowire(s) 12, 14. The branched nanowire device 10, 10', 100 containing nanowires 12, 14 with different diameters and/or indices of refraction, therefore, routes different wavelengths to different components connected to different branches of the device 10, 10', 100. Alternatively, the routing may be accomplished by electrically modulating an optical signal to direct it to one or more desired branches of the device 10, 10', 100, as described above.

Figure 5:
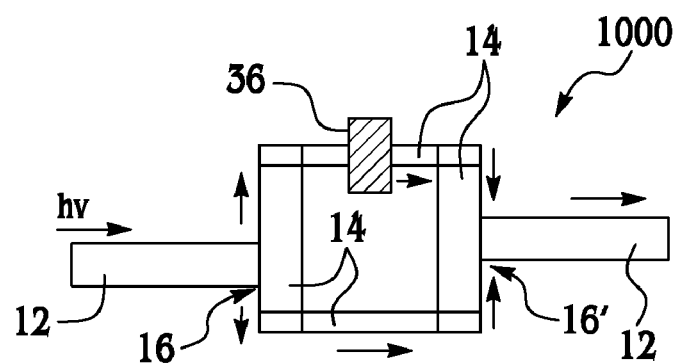
FIG. 5 is a schematic view of yet another embodiment of the optical device, incorporated into an interferometer.

Referring now to FIG. 5, the optical device 10, 10', 100 may also be used as an optical modulator by forming an interferometer 1000 (e.g., a Mach-Zender interferometer), where a light beam or signal is split at one junction 16, and light passing through one branch 12, 14 of the device 10, 10', 100 is phase shifted by an electrical or other signal (by phase shifter 36). The light in the two branches 14 is then recombined through another junction 16'. The intensity of the combined light is affected by the relative phases of the two beams. If the phase of the modulated signal is 180 degrees out of phase with that of the unmodulated signal, the two beams substantially cancel each other, and the magnitude of the light leaving the interferometer 1000 is at a minimum. If the phases of the two beams are the same, the intensities add together, and the magnitude of the light leaving the interferometer 1000 is at a maximum.

Another application in which the optical device 10, 10', 100, 100' may be used is a plasmonic waveguide. In this embodiment, the nanowire(s) 12, 14 are at least partially coated with a metal.

Referring now to FIG. 6, the optical device 10, 10', 100 may be used in an optical system 200 including a light beam source 202. The light beam source 202 may be a semiconductor laser, a light-emitting diode, or another source of light emitting wavelengths transmitted by one of the nanowires 12, 14. In another embodiment, the light beam may be generated from within nanowires 12, 14 of suitable materials. In the system 200 shown in FIG. 6, the primary nanowire 12 is exposed to a light beam 204 generated by the light beam source 202. In this embodiment, a detector 206 is positioned within the system 200 at or near an end of one or more of the nanowires 12, 14 to detect the light beam 204 exiting from the primary nanowire 12, the secondary nanowire(s) 14, or combinations thereof. Very generally, the detector 206 is positioned in the optical path of light traveling through and/or from nanowire 12, 14. It is to be understood that in some embodiments, the detector 206 may be integrated in the nanowire 12, 14. In a non-limiting example, upon exposure to various wavelengths of light, the optical system 200 propagates the light, for example, into a different direction, into multiple beams, into different wavelengths, etc. (as previously described).

While several embodiments have been described in detail, it will be apparent to those skilled in the art that the disclosed embodiments may be modified. Therefore, the foregoing description is to be considered exemplary rather than limiting.

What is claimed is:

1. An optical device, comprising:
   a primary nanowire having a predetermined characteristic that affects an optical property of the primary nanowire;
   at least one secondary nanowire grown from a surface of the primary nanowire such that an end thereof abuts a side of the primary nanowire at a non-zero angle and at a predetermined position along the side, the at least one secondary nanowire having an other predetermined characteristic that affects an optical property of the at least one secondary nanowire; and
   a junction formed between the primary nanowire and the at least one secondary nanowire, the device configured to cause a portion of a light beam of a predetermined wavelength or range of wavelengths traveling through one of the primary nanowire or the at least one secondary nanowire to enter another of the at least one secondary nanowire or the primary nanowire.

2. An interferometer, comprising:
   at least two primary nanowires, each having a predetermined characteristic that affects an optical property thereof;
   a plurality of secondary nanowires connecting the primary nanowires, each of the secondary nanowires having an other predetermined characteristic that affects an optical property thereof;
   a first junction formed between one of the at least two primary nanowires and a first of the plurality of secondary nanowires, the first junction configured to split a light beam traveling through the nanowires;
   a second junction formed between an other of the at least two primary nanowires and a second of the plurality of secondary nanowires, the second junction configured to re-combine the split light beam into the light beam; and
   a phase shifter integrated in a third of the plurality of secondary nanowires, located between the first and second of the plurality of secondary nanowires, and between the first and second junctions.

3. The optical device as defined in claim 1 wherein the light beam is split or routed at the junction.

4. The optical device as defined in claim 1, further comprising a modulator configured to modulate the light beam as it travels through the primary nanowire, the at least one secondary nanowire, or combinations thereof, wherein the modulator is a result of free carrier injection or includes a p-i-n core-shell structure that is integrated in the primary nanowire, the at least one secondary nanowire, or combinations thereof.

5. The optical device as defined in claim 1 wherein the light beam propagates into at least two directions when the light beam contacts the junction, and wherein propagation is based on the predetermined characteristics, the predetermined wavelength of the light beam, polarization of the light beam, a signal applied to the device, a bias applied to the device, or combinations thereof.

6. The interferometer as defined in claim 2 wherein the predetermined characteristic and the other predetermined characteristic are each selected from index of refraction of nanowire material, nanowire diameter, decorated nanowire surface, nanowire transmittance, nanowire absorbance, and combinations thereof.

7. The optical device as defined in claim 6 wherein the predetermined characteristic and the other predetermined characteristic are the same or different.

8. The optical device as defined in claim 1 wherein an optical property of the primary nanowire is modulated by non-optical behavior of the at least one secondary nanowire.

9. A method of making an optical device, comprising:
establishing a primary nanowire on a substrate surface, the primary nanowire having a first predetermined characteristic that affects an optical property of the primary nanowire; and
growing at least one secondary nanowire from a surface of the primary nanowire such that an end of the at least one secondary nanowire abuts a side of the primary nanowire at a non-zero angle and at a predetermined position along the side, the at least one secondary nanowire having a second predetermined characteristic that affects an optical property of the at least one secondary nanowire, thereby forming a junction between the primary nanowire and the at least one secondary nanowire, the device being configured to cause a portion of a light beam of a predetermined wavelength or range of wavelengths traveling through one of the primary nanowire or the at least one secondary nanowire to enter an other of the at least one secondary nanowire or the primary nanowire.

10. The method as defined in claim 9 wherein establishing the primary nanowire is accomplished by:
establishing a catalyst nanoparticle on the substrate surface; and
exposing the catalyst nanoparticle to a precursor gas, thereby growing the primary nanowire.

11. The method as defined in claim 9 wherein growing the at least one secondary nanowire is accomplished by:
establishing a sacrificial layer about the primary nanowire and to a predetermined height, whereby a portion of the primary nanowire is exposed;
establishing a nanoparticle on an area of the exposed portion of the primary nanowire that is adjacent to the sacrificial layer; and
exposing the nanoparticle to a precursor gas that initiates growth of the secondary nanowire.

12. The method as defined in claim 11 wherein establishing the nanoparticle is accomplished by 1) depositing a preformed nanoparticle on the primary nanowire, or 2) depositing a catalyst material on the sacrificial layer and adjacent to the primary nanowire, and annealing the catalyst material.

13. The method as defined in claim 9, further comprising controlling the predetermined characteristic of the primary nanowire, the second predetermined characteristic of the at least one secondary nanowire, or combinations thereof.

14. The method as defined in claim 13 wherein the predetermined characteristic and the other predetermined characteristic are each selected from index of refraction of nanowire material, nanowire diameter, decorated nanowire surface, nanowire transmittance, nanowire absorbance, and combinations thereof.

15. An optical system, comprising:
an optical device, including:
a primary nanowire having a predetermined characteristic that affects an optical property of the primary nanowire;
at least one secondary nanowire grown from a surface of the primary nanowire such that an end thereof abuts a side of the primary nanowire at a non-zero angle and at a predetermined position along the side, the at least one secondary nanowire having an other predetermined characteristic that affects an optical property of the at least one secondary nanowire; and
a junction formed between the primary nanowire and the at least one secondary nanowire, the device configured to cause a portion of a light beam of a predetermined wavelength or range of wavelengths traveling through one of the primary nanowire or the at least one secondary nanowire to enter an other of the at least one secondary nanowire or the primary nanowire; and
a light beam source.

16. The optical system as defined in claim 15, further comprising a detector positioned to detect the light beam traveling through the primary nanowire, the at least one secondary nanowire, or combinations thereof.

17. The optical system as defined in claim 15 wherein the predetermined characteristic and the other predetermined characteristic are each selected from index of refraction of nanowire material, nanowire diameter, decorated nanowire surface, nanowire transmittance, nanowire absorbance, and combinations thereof.

18. The optical system as defined in claim 17 wherein the predetermined characteristic and the other predetermined characteristic are the same or different.

19. The optical system as defined in claim 15 wherein the light beam source is integrated within the primary nanowire, the at least one secondary nanowire, or combinations thereof.

20. A method of manipulating the light beam using the device of claim 1, the method comprising exposing the primary nanowire to the light beam, whereby the light beam travels through the primary nanowire and contacts the junction, whereby at least a portion of the light beam is directed through the at least one secondary nanowire.

21. The interferometer as defined in claim 2 wherein the at least two primary nanowires and the plurality of secondary nanowires are each formed from semi-conductive materials having a predetermined band gap and a predetermined absorption level, insulating materials having a predetermined band gap, or combinations thereof.

* * * * *